United States Patent [19]

Toda

[11] 4,229,036
[45] Oct. 21, 1980

[54] PILLAR GARNISH

[75] Inventor: Tadayoshi Toda, Yokosuka, Japan

[73] Assignee: Nissan Motor Company, Limited, Japan

[21] Appl. No.: 9,915

[22] Filed: Feb. 6, 1979

[30] Foreign Application Priority Data

Feb. 10, 1978 [JP] Japan .................................. 53-16775

[51] Int. Cl.³ ............................................. B62D 33/00
[52] U.S. Cl. ................................ 296/202; 296/39 R; 52/732
[58] Field of Search ................ 296/202; 403/339, 340; 52/730, 732

[56] References Cited

U.S. PATENT DOCUMENTS

| 2,733,096 | 1/1956 | Waterhouse | 296/202 |
| 3,332,197 | 7/1967 | Hinkle | 52/732 |

FOREIGN PATENT DOCUMENTS 2259003  8/1975  France .................................... 296/39 R Primary Examiner—Robert R. Song
Attorney, Agent, or Firm—Lane, Aitken, Ziems, Kice & Kananen

[57] ABSTRACT

A vehicle body pillar garnish, made up of two individual pillar garnish members and having a seam mark defined by the mating edge portions of the pillar garnish members, is formed with a recess having two parallel bottom corners. One of the walls defining the recess is formed by one of the mating edges such that one of the corners coincides with the seam mark.

9 Claims, 12 Drawing Figures

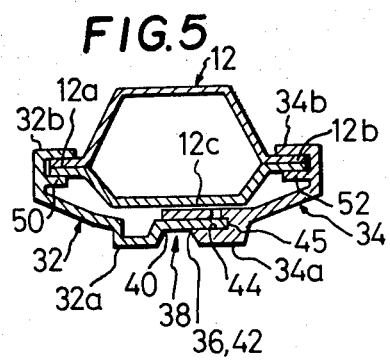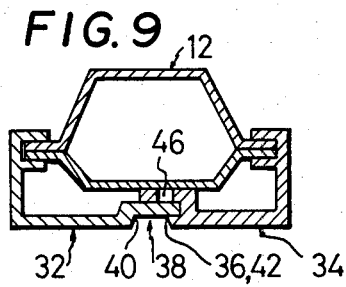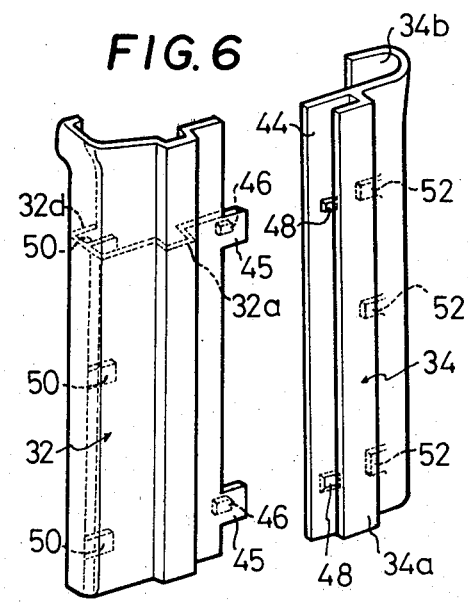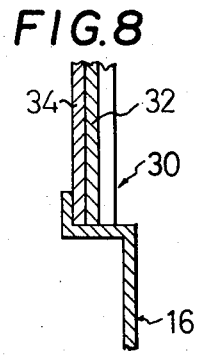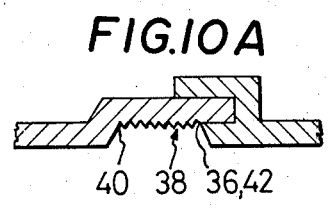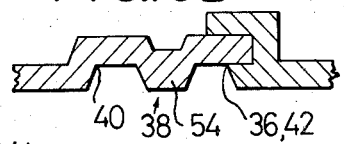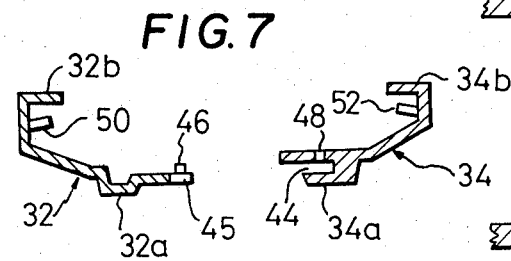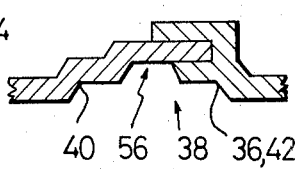

PILLAR GARNISH

BACKGROUND OF THE INVENTION

This invention relates in general to a garnish employed for covering a pillar post of a vehicle body and more particularly to a vehicle body pillar garnish of the type which is made up of a plurality of individual components or members.

A vehicle body pillar garnish, particularly of the kind used for covering a center pillar post of a vehicle body, is often made up of a plurality of individual pillar garnish members since a pillar post with a special external form can not be suitably covered by a one-piece pillar garnish, as is well known in the art. A typical structure of this type pillar garnish is illustrated in FIGS. 1 to 3 of the accompanying drawings of the present application. Referring to FIGS. 1 to 3, a pillar garnish assembly 10 is illustrated as attached to a center pillar post 12 of a vehicle, which is a left-sided post as viewed from the front of a vehicle. The pillar garnish assembly 10 is made up of individual upper and lower pillar garnishes 14 and 16. The upper pillar garnish 14 is further made up of individual forward and rearward pillar garnish members 14a and 14b. As seen best in FIG. 2, the forward and rearward pillar garnish members 14a and 14b are constructed to cover the forward and rearward flanges 12a and 12b of the pillar post 12, respectively and to be laid one upon the other to cover the body portion 12c of the pillar 12. The pillar garnish assembly 10 is mounted on the pillar post 12 as follows: first, the lower pillar garnish 16 is mounted in place; second, the forward pillar garnish member 14a is mounted in place and fixed by means of screws 18, which are screwed into the pillar post 12 through the holes 14c formed in the ear-like marginal extensions 14d of the forward pillar garnish member 14a; and lastly, the rearward pillar garnsih member 14b is mounted in place upon the forward pillar garnish member 14a and fixed by means of screws 20, which are screwed into the pillar post 12 through the holes 14e formed in the rearward pillar garnish member 14b.

In this instance, the lower pillar garnish 16 is made of one piece and fixedly held in place through the arrangement in which the upper end portion of the lower pillar garnish 16 is firmly clamped between the upper pillar garnish 14 and the pillar post 12. The bent edge portions 14f and 14g of the forward and rearward pillar garnish members 14a and 14b are only hooked on the flanges 12a and 12b, respectively. In FIG. 1, designated by reference numeral 22 is a seat, by 24 a door trim and by 26 is a kickplate fitted on a side-sill member of a vehicle body.

The upper pillar garnish 14 of the prior art pillar garnish assembly of the thus described type encounters a drawback that it not only is poor in appearance in itself but also looks, when fitted to a pillar post, as if it were inclined or turned toward its lateral side due to the effect of its seam mark or parting line defined by the mating edge portions of the pillar garnish members 14a and 14b. That is, the seam mark, being formed on the external surface of the pillar garnish 14, is easily seen by a passenger of a vehicle and deteriorates the appearance of the pillar garnish 14. Furthermore, the seam mark, being located on one lateral side of the pillar garnish 14, produces such an effect that the pillar garnish 14 looks, when fitted to the pillar post 12, as if it were inclined toward the lateral side where the seam mark is located.

The upper pillar garnish 14 further encounters a drawback that it is relatively costly since it requires screws 18 and 20 and further since its garnish members 14a and 14b are constructed to be fixed by means of screws 18 and 20, separately, thus resulting in a relatively time-consuming fitting operation.

SUMMARY OF THE INVENTION

It is accordingly an object of the present invention to provide a vehicle body pillar garnish of the type which is made up of at least two individual pillar garnish members, which is constructed to overcome the foregoing drawbacks existing in the prior art pillar garnish of the described type.

It is another object of the present invention to provide a vehicle body pillar garnish of the above type, which is constructed to appear as if it were made of one piece when its members are assembled together.

It is a further object of the present invention to provide a vehicle body pillar garnish of the above type, which is reduced in the number of necessary components and fitted to a pillar post through the simpler fitting operation, therefore being more economical as compared to a comparable prior art pillar garnish.

BRIEF DESCRIPTION OF THE DRAWINGS

These and other objects and advantages of the present invention will become more apparent from the following description in conjunction with the accompanying drawings, in which:

FIG. 5 is a cross sectional view taken along the line B—B of FIG. 4;

FIG. 6 is an exploded view showing the components of a pillar garnish according to the present invention of FIG. 4;

FIG. 7 is a cross sectional view showing the components of a pillar garnish according to the present invention of FIG. 4, the components being shown as separated from each other;

FIG. 8 is a sectional view taken along the line C—C of FIG. 4;

FIG. 9 is a cross sectional view, taken in a manner of FIG. 5, showing a modified embodiment of a pillar garnish according to the present invention; and FIGS. 10A to 10C are fragmentary cross sectional views of other modified embodiments of a pillar garnish according to the present invention.

DETAILED DESCRIPTION OF THE PREFERRED EMBODIMENT

Figure 1:
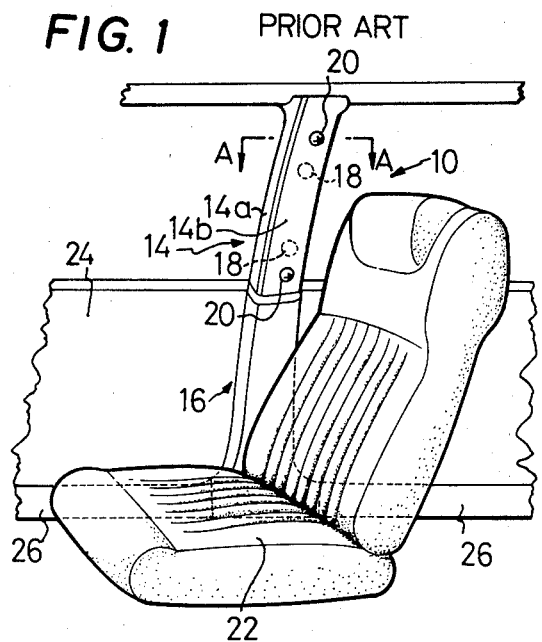
FIG. 1 is a perspective view showing a prior art pillar garnish assembly of the type which the present invention is concerned.
Figure 2:
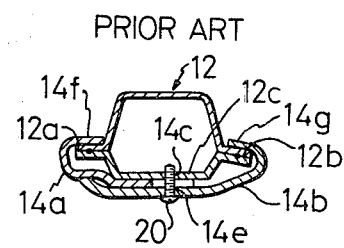
FIG. 2 is a cross sectional view taken along the line A—A of FIG. 1.
Figure 3:
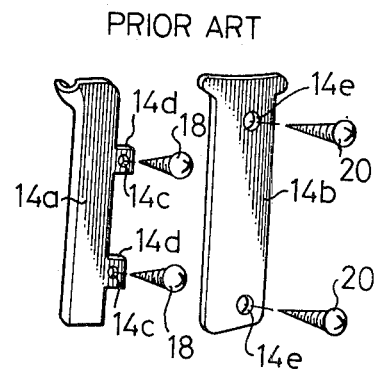
FIG. 3 is an exploded view showing the components of the prior art pillar garnish assembly of FIG. 1.
Figure 4:
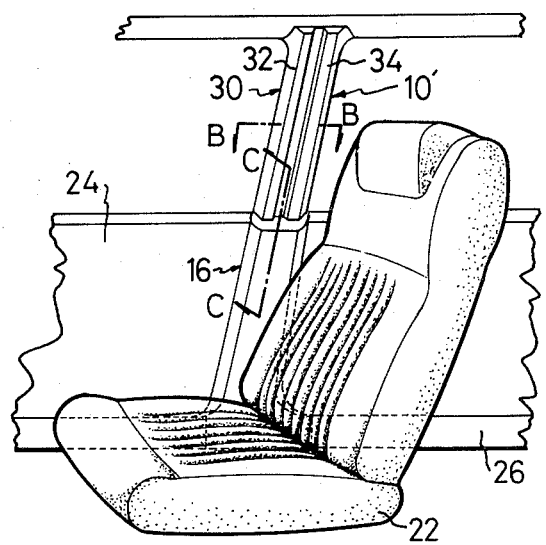
FIG. 4 is a perspective view of a pillar garnish assembly which is mounted on a center pillar post of a vehicle body and in which is incorporated a pillar garnish according to the present invention.

Referring to FIGS. 4 to 8 inclusive, a preferred embodiment of a pillar garnish according to the present invention will be explained. In FIGS. 4 and 5, like parts to the prior art pillar garnish assembly and the vehicle body structure of FIGS. 1 and 2 will be given like reference numerals and will not be described in detail again.

In a pillar garnish assembly 10' of FIG. 4, it is an upper pillar garnish 30 that is constructed to implement the present invention. The pillar garnish 30 according to the present invention is made up of individual forward and rearward pillar garnish members 32 and 34. As shown in FIG. 5, the forward and rearward pillar garnish members 32 and 34 are adapted, when assembled together, to form the pillar garnish 30 which has on its outer surface a seam mark or parting line 36. The pillar garnish members 32 and 34 are so shaped as to be cooperative to form, when assembled together, a groove or recess 38 which extends along the seam mark 36. The groove 38 is bounded by side and bottom walls which intersect to form two bottom edges or corners 40 and 42 extending substantially parallel to each other and preferably located on the same plane so that the groove 38 is of an uniform depth. Of the walls defining the groove 38, one side wall is formed by the edge portion of the pillar garnish member 34 such that the corner 42 and the seam mark 36 coincide with each other. The remaining walls of the groove 38 are formed by the pillar garnish 32. To this end, the edge portion of the pillar garnish 32 is formed with a step as shown.

Preferably, the pillar garnish members 32 and 34 are respectively formed with projections 32a and 34a, between which the foregoing groove 38 is defined when the pillar garnish members 32 and 34 are assembled together. The projections 32a and 34a are of the same width and of the same height; that is, the flat tops of the projections 32a and 34a are located on the same plane which is substantially parallel to the plane on which the corners 40 and 42 are located. Preferably, the tops of the projections 32a and 34a are bounded by sharp edges which are substantially parallel to the corners 40 and 42.

Preferably, the forward and rearward pillar garnish members 32 and 34 are constructed such that the groove 38 and the projections 32a and 34a are symmetrically arranged so as to provide a substantially symmetric outer form of the pillar garnish 30. That is, the forward and rearward pillar garnish members 32 and 34 are constructed such that the forward and rearward parts (the left and right parts as viewed in the drawing) of the external form of the pillar garnish 30 substantially correspond to each other.

Preferably, the mating lateral edge portions of the forward and rearward pillar garnish members 32 and 34 are constructed as follows: That is, one of the mating edge portions of the pillar garnish members 32 and 34, (for example as shown best in FIG. 6, the edge portion of the rearward pillar garnish member 34) is constructed to have a channel 44 for receiving the corresponding edge portion of the forward pillar garnish member 32. The edge portion of the forward pillar garnish member 32 has marginal extensions 45 which are formed with, on their inside surfaces, locking pins 46, respectively. The edge portion of the rearward pillar garnish member 34 includes inner and outer walls defining the channel 44 and is formed with, in its inner wall, locking pin-receiving openings 48. The locking pins 46 and the openings 48 are adapted to constitute a fastening means for securely fastening the pillar garnish members 32 and 34 together when the edge portion of the forward pillar garnish 32 is inserted into the channel 44 of the rearward pillar garnish member 34 and the locking pins 46 are inserted into the openings 48.

Preferably, the bent edges of the forward and rearward pillar garnish members 32 and 34 are constructed as follows: That is, the bent edge of the forward pillar garnish member 32 is constructed to have a base portion 32b extending throughout the length of the pillar garnish member 32 and a plurality of engaging arms 50 arranged over the base portion 32b. As shown, the engaging arms 50 are spaced from one another along the entire length of the base portion 32b. Similarly, the bent edge of the rearward pillar garnish member 34 is constructed to have a base portion 34b and a plurality of engaging arms 52. The engaging arms 50 and 52 and the base portions 32b and 34b are cooperative to firmly clamp therebetween the flanges 12a and 12b, respectively. As shown in FIG. 7, the engaging arms 50 and 52 are further constructed such that, before the pillar garnish members 32 and 34 are mounted on the pillar post 12, they are slanted toward the base portions 32b and 34b, respectively; that is, they extend toward their free ends to come nearer to the base portions 32b and 34b, respectively.

Referring to FIG. 8, in order that the lower pillar garnish 14 is fixedly held in place, an arrangement is made in which the upper end portion of the lower pillar garnish 14 is clamped between the lower end portions of the pillar garnish members 32 and 34 and the pillar post 12.

The pillar garnish 30 thus constructed according to the present invention is fitted to the pillar post 12 together with the lower pillar garnish assembly 14 as follows:

First, the lower pillar garnish 14 is mounted in place on the pillar post 12 and fixed by means of the kickplate 26 which presses down the lower end portion of the lower pillar garnish 14 against the vehicle body structure. Then, the forward and rearward pillar garnish members 32 and 34 of the upper pillar garnish 30 are mounted on the pillar post 12 in such a manner that the lower end portions of the pillar garnish members 32 and 34 are fittingly placed on the upper end portion of the lower pillar garnish 16 and that the flanges 12a and 12b of the pillar post 12 are clamped between the base portions 32b and 34b and the engaging arms 50 and 52, respectively. The mating edge portions of the forward and rearward pillar garnish members 32 and 34 are then coupled together in such a manner that the locking pins 46 are inserted into the corresponding openings 48, respectively. The pillar garnish 30 according to the present invention is thus fixedly mounted on the pillar post 12 together with the lower pillar garnish 16.

From the description thus far made, it will be appreciated that a pillar garnish 30 according to the present invention is constructed such that it looks, when its garnish members 32 and 34 are assembled together, as if it were made of one piece due to the effect of the arrangement in which the seam mark 36 is adapted to simulate one corner 42 of the corners of the groove 38.

It will be further appreciated that the pillar garnish 30 according to the present invention is effective in improving the appearance of a vehicle compartment, particularly when the groove 38 is symmetrically arranged to provide a symmetrical external form of the pillar garnish 30.

It will be still further appreciated that the pillar garnish 30 according to the present invention is relatively economical as compared to a comparable prior art pillar garnish since the pillar garnish of this invention does not require screws and therefore is reduced in the number of necessary components and further since the pillar garnish of this invention can be fitted to a pillar post through the simpler fitting operation.

While a pillar garnish according to the present invention is thus far described and shown, it can be modified as illustrated in FIGS. 9 and 10A to 10C according to the present invention. That is, a pillar garnish of this invention can be of a simple cross section as shown in FIG. 9 in place of the cross section of FIG. 5. Furthermore, as illustrated in FIG. 10A, a serrated bottom wall can be employed in place of the flat bottom wall defining the bottom of the groove 38 of FIG. 5. Still furthermore, as illustrated in FIG. 10B, the groove 38 of FIG. 5 can be modified such that the bottom wall defining the bottom of the groove 38 is formed with a projection 54 which extends along the entire length of the groove 38. Still furthermore, as illustrated in FIG. 10C, the groove 38 of FIG. 5 can be modified such that the bottom wall defining the bottom of the groove 38 is formed with a groove 56 which extends along the entire length of the groove 38. The embodiments of FIGS. 10A to 10C are effective in enhancing the effect of the arrangement in which the seam mark is adapted to simulate one of the corners of the groove 38.

What is claimed is:

1. In a vehicle body pillar garnish made up of two individual pillar garnish members and having a seam mark formed by the mating edge portions of said pillar garnish members, the improvement being in that one of the mating edge portions of said pillar garnish members is formed with a step which cooperates with the other of said mating edge portions to form a recess having at least two bottom corners, one of which coincides with said seam mark.

2. The improvement in a vehicle body pillar garnish as claimed in claim 1, in which said recess is of a symmetric form.

3. The improvement in a vehicle body pillar garnish as claimed in claim 2, in which said recess is arranged in a manner to provide a substantially symmetric external form of the pillar garnish.

4. The improvement in a vehicle body pillar garnish as claimed in claim 1 further in that a channel is formed in one of the mating edge portions of said pillar garnish members and receiving therein the other edge portion, a plurality of openings are formed in said one edge portion, and a plurality of locking pins are formed in said other edge portion and inserted into said openings, respectively such that said pillar garnish members are securely fastened together.

5. The improvement in a vehicle body pillar garnish as claimed in claim 1 further in that a pair of projections are respectively formed in said pillar garnish members, said projections corresponding in shape to each other and arranged substantially symmetrically with respect to said recess.

6. The improvement in a vehicle body pillar garnish as claimed in claim 5, in which said projections include tops bounded by edges which are substantially parallel to said corners.

7. The improvement in a vehicle body pillar garnish as claimed in claim 1, in which said recess is defined by walls which are formed by said mating edge portions of the pillar garnish members, said recess defining walls including a serrated bottom wall which defines the bottom of said recess.

8. The improvement in a vehicle body pillar garnish as claimed in claim 1, in which said recess is defined by walls which are formed by said mating edge portions of the pillar garnish members, said recess defining walls including a bottom wall which is formed with a projection extending along the entire length of said recess, said bottom wall defining the bottom of said recess.

9. The improvement in a vehicle body pillar garnish as claimed in claim 1, in which said recess is defined by walls which are formed by said mating edge portions of the pillar garnish members, said recess defining walls including a bottom wall which is formed with a groove extending along the entire length of said recess, said bottom wall defining the bottom of said recess.

* * * * *